(12) United States Patent  
Burgoyne

(10) Patent No.: US 10,135,220 B2
(45) Date of Patent: Nov. 20, 2018

(54) SYNCHRONIZED TUNABLE MODE-LOCKED LASERS

(71) Applicant: Halifax Biomedical Inc., Mabou (CA)

(72) Inventor: Bryan Burgoyne, Montreal (CA)

(73) Assignee: Halifax Biomedical Inc., Mabou (CA)

( * ) Notice: Subject to any disclaimer, the term of this patent is extended or adjusted under 35 U.S.C. 154(b) by 0 days.

(21) Appl. No.: 15/667,440

(22) Filed: Aug. 2, 2017

(65) Prior Publication Data

US 2018/0048112 A1    Feb. 15, 2018

Related U.S. Application Data

(63) Continuation of application No. 15/030,436, filed as application No. PCT/IB2014/065514 on Oct. 21, 2014.

(Continued)

(51) Int. Cl.
*H01S 3/11* (2006.01)
*H01S 3/23* (2006.01)

(Continued)

(52) U.S. Cl.
CPC .......... *H01S 3/1109* (2013.01); *H01S 3/0675* (2013.01); *H01S 3/06791* (2013.01);

(Continued)

(58) Field of Classification Search
CPC .... H01S 3/1106–3/1121; H01S 3/2391; H01S 3/106–3/1095; H01S 3/0675; H01S 3/08086–3/0809; G01J 2003/102
See application file for complete search history.

(56) References Cited

U.S. PATENT DOCUMENTS

| | | | |
|---|---|---|---|
| 4,405,237 A | 9/1983 | Manuccia et al. | |
| 4,685,111 A * | 8/1987 | Baer | H01S 3/1109 322/25 |

(Continued)

FOREIGN PATENT DOCUMENTS

| | | |
|---|---|---|
| WO | 2000038193 | 6/2000 |
| WO | 03/043149 | 5/2003 |

(Continued)

OTHER PUBLICATIONS

International search report dated Feb. 27, 2015 for PCT application PCT/CA2011/000917 filed Oct. 21, 2014, from which the present application claims priority.

(Continued)

*Primary Examiner* — Joshua King

(57) ABSTRACT

A synchronized laser system for illuminating a sample with first and second laser light pulses, said system comprising: a trigger, said trigger being operative to issue first and second trigger signals, said first and second trigger signals being emitted at an adjustable frequency with a predetermined delay therebetween; a first tunable mode-locked laser operative for emitting said first laser light pulses in response to receiving a train of said first trigger signals, a first wavelength of said first laser light pulses being dependent on said adjustable frequency in accordance with a first wavelength-frequency relationship; a second tunable mode-locked laser operative for emitting said second laser light pulses in response to receiving a train of said second trigger signals, a second wavelength of said second laser light pulses being dependent on said adjustable frequency in accordance with a second wavelength-frequency relationship; wherein said predetermined delay is such that said first and second laser light pulses are emitted so as to arrive substantially simultaneously in said sample; and said first and second wavelength-frequency relationships are selected (Continued)

to result in a predetermined relationship between said first and second wavelengths at each frequency.

15 Claims, 14 Drawing Sheets

Related U.S. Application Data

(60) Provisional application No. 61/893,494, filed on Oct. 21, 2013.

(51) Int. Cl.
*H01S 3/109* (2006.01)
*H01S 3/08* (2006.01)
*H01S 3/106* (2006.01)
*H01S 3/067* (2006.01)
*H01S 3/10* (2006.01)

(52) U.S. Cl.
CPC ...... *H01S 3/08054* (2013.01); *H01S 3/08086* (2013.01); *H01S 3/109* (2013.01); *H01S 3/1061* (2013.01); *H01S 3/2391* (2013.01); *H01S 3/10053* (2013.01); *H01S 3/2383* (2013.01)

(56) References Cited

U.S. PATENT DOCUMENTS

| | | | | |
|---|---|---|---|---|
| 5,258,612 A * | 11/1993 | Clark | ................... | G01N 21/636 250/226 |
| 5,434,877 A * | 7/1995 | Chung | ................. | H04B 10/506 372/18 |
| 5,498,875 A | 3/1996 | Obremski et al. | | |
| 5,627,848 A | 5/1997 | Fermann et al. | | |
| 5,701,319 A | 12/1997 | Fermann | | |
| 6,091,744 A | 7/2000 | Sorin et al. | | |
| 6,108,081 A | 8/2000 | Holtom et al. | | |
| 6,141,359 A | 10/2000 | Cunningham et al. | | |
| 6,151,522 A | 11/2000 | Alfano et al. | | |
| 6,192,058 B1 * | 2/2001 | Abeles | ................. | G02B 6/4248 359/337.11 |
| 6,510,167 B1 | 1/2003 | Jain et al. | | |
| 6,631,145 B1 * | 10/2003 | Tamura | ............... | H01S 5/06256 372/18 |
| 6,747,274 B2 | 6/2004 | Li | | |
| 6,845,108 B1 | 1/2005 | Liu et al. | | |
| 7,046,704 B2 | 5/2006 | Fischer | | |
| 7,092,101 B2 | 8/2006 | Brady et al. | | |
| 7,280,215 B2 | 10/2007 | Salnik et al. | | |
| 7,291,839 B1 * | 11/2007 | Demers | ..................... | G01J 3/42 250/338.1 |
| 7,570,349 B2 | 8/2009 | Vachss et al. | | |
| 7,652,769 B2 | 1/2010 | Zhao et al. | | |
| 7,787,118 B2 | 8/2010 | Klug et al. | | |
| 8,085,822 B2 | 12/2011 | Villeneuve | | |
| 2002/0090650 A1 | 7/2002 | Empedocles et al. | | |
| 2003/0185255 A1 * | 10/2003 | Ye | ........................ | H01S 3/1109 372/18 |
| 2004/0052276 A1 * | 3/2004 | Lou | ........................ | H01S 3/067 372/6 |
| 2005/0110990 A1 | 5/2005 | Koo | | |
| 2006/0029110 A1 | 2/2006 | Cho et al. | | |
| 2006/0159137 A1 | 7/2006 | Shah | | |
| 2008/0161697 A1 | 7/2008 | Chance | | |
| 2008/0291444 A1 * | 11/2008 | Donaldson | ............ | G01J 3/4338 356/317 |
| 2009/0021724 A1 | 1/2009 | Mahadevan-Jansen et al. | | |
| 2013/0050693 A1 * | 2/2013 | Villeneuve | ................. | G01J 3/10 356/301 |
| 2013/0136147 A1 * | 5/2013 | Villeneuve | ............ | H01S 3/0675 372/6 |

FOREIGN PATENT DOCUMENTS

| | | | | |
|---|---|---|---|---|
| WO | WO 2011038508 A1 * | 4/2011 | ................ | G01J 3/10 |
| WO | WO 2011041472 A1 * | 4/2011 | ............. | G01N 21/31 |
| WO | WO 2012019290 A1 * | 2/2012 | ........... | H01S 3/0675 |
| WO | 2013/029154 | 3/2013 | | |
| WO | WO 2013127370 A1 * | 9/2013 | ................ | G01J 3/42 |

OTHER PUBLICATIONS

Written opinion dated Feb. 27, 2015 for PCT application PCT/CA2011/000917 filed Oct. 21, 2014, from which the present application claims priority.

Extended search report dated Jul. 7, 2017 for European Patent Application 14856176.4 corresponding to the present application.

* cited by examiner

SYNCHRONIZED TUNABLE MODE-LOCKED LASERS

FIELD OF THE INVENTION

The present invention relates to the general field of optics, and is particularly concerned with the synchronization of tunable mode-locked lasers.

BACKGROUND

"Electrical Wavelength-Tunable Actively Mode-Locked Fiber Ring Laser with a Linearly Chirped Fiber Bragg Grating" by Li et Chan published in IEEE PHOTONICS TECHNOLOGY LETTERS, VOL. 10, NO. 6, JUNE 1998 799 describes a tunable mode locked laser in which changes in the frequency of variations in absorption in the laser cavity result in changes in cavity length. In turn, changes in cavity length result in changes in the wavelength of the light emitted by the laser. One manner of achieving this result is to reflect the light in the cavity with a chirped fiber Bragg grating (FBG) in which different wavelengths are reflected at different longitudinal positions along the FBG.

In some applications, there is a need to synchronize two or more such lasers. More generally, there is a need to synchronize two or more dispersion-tuned actively mode-locked lasers (DTAML). In these lasers, dispersion is used to tune the mode-locked lasers. The use of FBGs is an example of such dispersion tuning, but any other manner of creating a different round trip travel time of a laser pulse in a laser cavity as a function of wavelength through the use of dispersion is usable. There are several issues in synchronization of such laser oscillators. The two main issues are 1) adjusting the delay between the outputs of both lasers so their pulses overlap and 2) having both lasers operate at exactly the same repetition rate. Since DTAML are actively model-locked, the timing of the output pulses is determined by the electronic signals driving the mode locker.

Against this background, there exists a need in the industry to provide synchronize tunable model-locked lasers. An object of the present invention is therefore to provide such lasers.

SUMMARY OF THE INVENTION

In a broad aspect, the invention provides a synchronized laser system for illuminating a sample with first and second laser light pulses having respectively first and second wavelengths, the system comprising: a trigger, the trigger being operative to issue first and second trigger signals, the first and second trigger signals being periodic and emitted at a common adjustable frequency with a predetermined delay therebetween, the adjustable frequency being included in a predetermined frequency interval; a first tunable mode-locked laser operative for emitting the first laser light pulses in response to receiving a first train of the first trigger signals, the first wavelength of the first laser light pulses being dependent on the adjustable frequency in accordance with a first wavelength-frequency relationship, the first tunable mode-locked laser being operative over a first repetition rate range part of the predetermined frequency interval to produce the first laser light with the first wavelength within a first laser tuning range; a second tunable mode-locked laser operative for emitting the second laser light pulses in response to receiving a second train of the second trigger signals, the second wavelength of the second laser light pulses being dependent on the adjustable frequency in accordance with a second wavelength-frequency relationship, the second tunable mode-locked laser being operative over a second repetition rate range part of the predetermined frequency interval to produce the second laser light with the second wavelength within a second laser tuning range. The predetermined delay is such that the first and second laser light pulses are emitted so as to arrive substantially simultaneously in the sample. The first and second wavelength-frequency relationships are selected to result in a predetermined relationship between the first and second wavelengths at each adjustable frequency from the predetermined frequency interval at which the first and second repetition rate ranges overlap.

In some embodiments of the invention, the first and second wavelength-frequency relationships are such that the second wavelength varies less as a function of the adjustable frequency than the first wavelength over the predetermined frequency interval so that over the predetermined frequency interval, the first wavelength varies more than the second wavelength.

In some embodiments of the invention, the second wavelength varies at least 100 times more slowly than the first wavelength as function of the adjustable frequency.

In some embodiments of the invention, the sample defines an interaction bandwidth of interest including wavelengths over which a predetermined light-matter interaction occurs, the second laser tuning range being within the interaction bandwidth.

In some embodiments of the invention, the sample includes a non-linear material, the predetermined light-matter interaction including a non-linear light-matter interaction occurring in the interaction bandwidth of interest.

In some embodiments of the invention, the non-linear material is a frequency doubling material. For example, the frequency doubling material is a Lithium Niobate ($LiNbO_3$) crystal, a Barium Borate crystal ($BaB_2O_4$) or a Potassium Titanyl Phosphate crystal ($KTiOPO_4$).

In some embodiments of the invention, a non-linear material is inserted between the second tunable mode-locked laser and the sample.

In some embodiments of the invention, the non-linear material is a frequency-doubling material operative for producing light having a third wavelength that is half the first wavelength when illuminated with the first laser light pulses.

In some embodiments of the invention, the first repetition rate range is entirely included in the second repetition rate range.

In some embodiments of the invention, the first and second wavelength-frequency relationships are such that the first and second wavelengths are respectively a first and a second monotonous function of the adjustable frequency.

In some embodiments of the invention, the predetermined frequency interval defines a first interval region and a second interval region, the first and second wavelength-frequency relationships being such that the first and second wavelengths are respectively monotonous functions of the adjustable frequency over each of the first and second interval regions.

In some embodiments of the invention, the first tunable mode-locked laser is operative for emitting third laser light pulses in response to receiving the first train of the first trigger signals, a third wavelength of the third laser light pulses being dependent on the adjustable frequency in accordance with a third wavelength-frequency relationship, the first tunable mode-locked laser being operative over the first repetition rate range to also produce the third laser light with the third wavelength within a third laser tuning range.

In some embodiments of the invention, the second tunable mode-locked laser is operative for emitting fourth laser light pulses in response to receiving the second train of the second trigger signals, a fourth wavelength of the fourth laser light pulses being dependent on the adjustable frequency in accordance with a fourth wavelength-frequency relationship, the second tunable mode-locked laser being operative over the second repetition rate range to also produce the fourth laser light with the fourth wavelength within a fourth laser tuning range. In some embodiments of the invention, outside of the first and second repetition rate ranges, the first and second tunable mode-locked lasers are inoperational to produce respectively the first and second laser light pulses.

Advantageously, the proposed system allows for substantially simultaneous emission of laser light pulses from two or more dispersion-tuned actively mode-locked lasers with precise control of the emitted wavelengths.

Other objects, advantages and features of the present invention will become more apparent upon reading of the following non-restrictive description of preferred embodiments thereof, given by way of example only with reference to the accompanying drawings.

DETAILED DESCRIPTION

Figure 1:
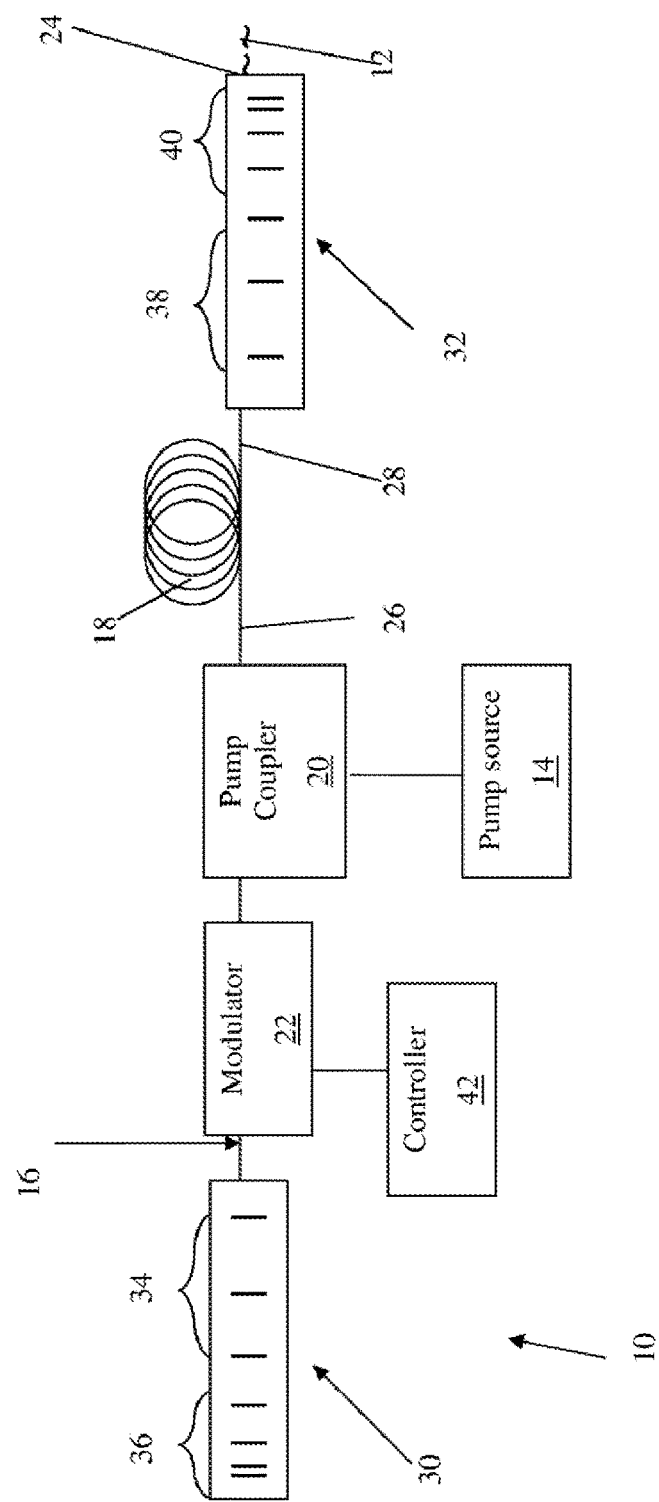
FIG. 1, in a schematic view, illustrates a tunable laser usable with an embodiment of the present invention.

FIGS. 1 to 10 describe various tunable mode-locked lasers that one may wish to synchronize with other similar lasers. Referring to FIG. 1, there is shown a tunable laser 10 for selectively emitting laser light 12 having a first wavelength and a second wavelength. While in some embodiments of the invention the tunable laser 10 is able emit laser light 12 having two different, discretely spaced apart, wavelengths, it is also within the scope of the invention to have a tunable laser 10 that is able to emit laser light 12 having more than two different wavelengths and laser light having a wavelength contained within a substantially continuous spectrum of wavelengths included in a predetermined wavelength interval.

The tunable laser 10 includes a pump light source 14 for emitting a pump light (not shown in the drawings). The tunable laser 10 also includes an optical resonator 16. The optical resonator 16 has a configuration, optical properties and dimensions such that a first round trip time of the laser light 12 having the first wavelength in the optical resonator 16 differs from a second round trip time of the laser light 12 having the second wavelength in the optical resonator 16. A gain medium 18 is inserted in the optical resonator 16 and is optically coupled to the pump light source 14. The gain medium 18 defines a gain medium first end 26 and a substantially opposed gain medium second end 28. The reader skilled in the art will understand that the terminology "gain medium first and second ends 26 and 28" does not imply that the gain medium 18 is necessarily rectilinear. For example, the gain medium may be formed by a rolled optical fiber. The gain medium 18 is responsive to the pump light for converting the pump light into the laser light 12. For example, the tunable laser 10 includes a pump light input port 20, also referred to as a pump coupler, optically coupled to the gain medium 18 for receiving the pump light and conveying the pump light to the gain medium 18. It should be noted that in alternative embodiments of the invention, any other suitable gain medium 18 is usable, including for example a semi-conductor gain medium, among other possibilities.

An optical intensity modulator 22 is inserted in the optical resonator 16 for selectively absorbing a portion of the laser light 12 as the laser light 12 propagates back and forth in the optical resonator 16. The optical intensity modulator 22 has a light absorption coefficient that is modulated with a modulation period. The modulation period is selectively adjustable between a first modulation period value and a second modulation period value. The first and second round trip times are substantially equal to a respective integer multiple of respectively the first and second modulation period values.

The tunable laser 10 further includes an output port 24 for releasing the laser light 12 from the optical resonator 16. In some embodiments of the invention, a tunable laser cavity is provided instead of a tunable laser 10. The tunable laser cavity is simply a tunable laser 10 from which the pump light source 14 has been removed. The tunable laser cavity is usable with the pump light source 14 to build the tunable laser 10.

When the gain medium 18 is pumped with the pump light, modulating the optical intensity modulator 22 with the first modulation period value produces laser light having the first wavelength. Also, modulating the optical intensity modulator 22 with the second modulation period value produces laser light having the second wavelength.

Indeed, when the optical intensity modulator 22 is modulated, there will be periodic time intervals during which the optical intensity modulator 22 absorbs more light than at subsequent or previous moments. Since the laser light 12 is preferentially transmitted through the optical intensity modulator 22 at predetermined periodic time intervals, there will be a preference for the tunable laser 10 to operate with laser light pulses circulating within the optical resonator 16 in a manner such that these laser light pulses have a round trip time that is equal to the modulation period with which the optical intensity modulator is modulated, or a multiple of this modulation period. The configuration of the optical resonator 16 will therefore favor laser light pulses within the optical resonator 16 that have a round trip time corresponding respectively to the first and second wavelengths when the optical intensity modulator 22 is respectively modulated with the first and second modulation period values. The pulse duration of the pulses is governed by many factors, among which are the power provided by the pump light source 14, the dispersion in the whole tunable laser 10 and the exact wave shape of the modulation provided by the optical intensity modulator 22.

It has been found particularly advantageous in some embodiments of the invention to change the modulation period in steps instead of continuously. Indeed, lasers have a tendency to be locked at a predetermined wavelength when operating. Changing the modulation period in a substantially continuous manner from the first to the second modulation period values may then cause instabilities and, in turn, promote difficult mode locking at the second wavelength. By changing the modulation periods in discreet steps, tuning occurs faster using commonly available components.

In some embodiments of the invention, modulating the absorption coefficient of the optical intensity modulator 22 with a signal that is the sum of many single-frequency signals helps in modulating the output laser light 12. For example, by modulating the absorption coefficient with a signal that is the sum of two sinusoidal signals having frequencies that are close to each other, the laser light 12 has an output that varies sinusoidally with a frequency that is equal to the beat frequency of the two sinusoidal signals.

In other embodiments, the optical intensity modulator has an absorption coefficient that is modulated temporally in any suitable manner to produce a corresponding temporal intensity profile of the pulses of laser light produced. The temporal modulation is periodic with a period corresponding to the round trip time in the optical resonator 16.

In yet other embodiments, multi-wavelength pulses can be produced. To that effect, the optical resonator 16 is such that the two or more wavelengths have the same round trip time in the optical resonator 16. In the specific case in which the optical resonator 16 includes a fiber Bragg grating, which are described in further details hereinbelow, the group delay as a function of wavelength in the Bragg grating must not increase of decrease monotonically. In a specific example of implementation, thenumber of wavelengths is equal to the number of zeros in the dispersion. Also, the derivative of variations in reflected wavelength with position along the Bragg grating determines the tuning rate of each of the wavelengths. However, there are other manners in which the optical resonator 16 can be configured to achieve the same results. It should be noted that due to the physical structure of these embodiments, laser light at all wavelengths are produced synchronously and are tuned at different, customizable rates.

In yet other embodiments of the invention, the optical resonator 16 is such that different wavelength light impulsions have different round trip times, as in the "base" embodiment first described hereinabove. In these embodiments, by modulating the optical intensity modulator 22 with a modulation that is a sum of modulation corresponding to many wavelengths produced in the case of single period modulation, pulse trains of laser light having impulsions of different wavelengths can be produced. In other words, the pulse trains produced are a linear superposition of individual pulse trains having different wavelengths, and therefore repetition rates. This increases the pulse repetition rate and scans many frequencies over relatively short amounts of time. As in the other embodiments of the invention, the optical modulation is either complete (complete absorption) or partial (partial absorption at maximal absorption), with a possibility of pulse shaping.

In the embodiment of the invention shown in FIG. 1, the optical resonator 16 includes a first reflector 30 and a second reflector 32. The first and second reflectors 30 and 32 are each reflective at about the first and second wavelengths. The first and second reflectors 30 and 32 are optically coupled to the gain medium 18 respectively through the gain medium first and second ends 26 and 28. It should be noted that, in some embodiments of the invention, other optical components are present between either of the reflectors 30 and 32 and the gain medium 18. Therefore, the first and second reflectors 30 and 32 need not be directly physically coupled to the gain medium 18.

The first reflector 30 includes a first reflector first portion 34 and a first reflector second portion 36 for reflecting respectively the laser light 12 having the first and second wavelengths. The first reflector first and second portions 34 and 36 are respectively spaced apart from the gain medium first end 26 by a first reflector first portion-to-gain medium distance and a first reflector second portion-to-gain medium distance. The first reflector first portion-to-gain medium distance is smaller than the first reflector second portion-to-gain medium distance. Therefore, the first reflector first portion 34 must be transmitting the second wavelength so that laser light having the second wavelength can reach the first reflector second portion 36.

Similarly, the second reflector 32 includes a second reflector first portion 38 and a second reflector second portion 40 for reflecting respectively the laser light 12 having the first and second wavelengths. The second reflector first and second portions 38 and 40 are respectively spaced apart from the gain medium second end 28 by a second reflector first portion-to-gain medium distance and a second reflector second portion-to-gain medium distance. The second reflector first portion-to-gain medium distance is smaller than the second reflector second portion-to-gain medium distance. Therefore, the second reflector first portion 38 must be transmitting the second wavelength so that laser light having the second wavelength can reach the second reflector second portion 40.

The first and second reflector first portions 34 and 38 are thus distanced from each other by a smaller distance than the first and second reflector second portions 36 and 40. This will cause the laser light 12 having the first wavelength to have a smaller first round trip time between the first and second reflector first portions 34 and 38 than the round trip time of the laser light 12 having the second wavelength between the first and second reflector second portions 36 and 40. In a specific embodiment of the invention, the first and second reflectors 30 and 32 each include a respective fiber Bragg grating. For example, the first reflector first and second portions 34 and 36 include respectively a first and a second fiber Bragg grating segment. In a specific embodiment of the invention, the first reflector first and second portions 34 and 36 each include a respective chirped fiber Bragg grating segment, which may be formed by having a single chirped fiber Bragg grating that defines both the first reflector first and second portions 34 and 36. In some specific embodiment of this latter construction, a tunable laser 10 having continuous wavelength selection is provided.

In some embodiments of the invention, the first wavelength is larger than the second wavelength and the chirped fiber Bragg gratings included in the first and second reflectors 30 and 32 also provides dispersion compensation. However, in alternative embodiments of the invention, the first wavelength is smaller than the second wavelength, which may be useful in embodiments in which other components of the proposed tunable laser 10 have anomalous dispersion properties.

In some embodiments of the invention, the first reflector 30 includes a relatively highly reflective chirped fiber Bragg grating. In these embodiments, substantially all the light incoming at the first reflector 30 is reflected back towards the gain medium 18. The second reflector 32 is an output chirped fiber Bragg grating and is not perfectly reflective so that some of the laser light 12 can be transmitted through the second reflector 32, which therefore provides the output port 24. Other manners of outputting the laser light 12 from the tunable laser 10 are within the scope of the invention and some of them are described in further details hereinbelow.

In some embodiments of the invention, the gain medium 18 has a first gain at the first wavelength and a second gain at the second wavelength. The first and second gains differ from each other. In these embodiments, to facilitate the production of laser light 12 having substantially similar powers at the two wavelengths, the first and second fiber Bragg grating segments included in the first reflector first and second portions 34 and 36 have respectively a first segment reflectivity and a second segment reflectivity. The first and second segment reflectivities are such that the tunable laser 10 has substantially constant gain at the first and second wavelengths. Therefore, it is possible to select the reflectivity of the first reflector first and second portions 34 and 36 so that the reflection of the laser light 12 at these first reflector first and second portions 34 and 36 compensates for the non-flat gain curve of the gain medium 18.

In some embodiments of the invention, one or both the first and second reflectors 30 and 32 are each made from a chirped fiber Bragg grating defining a variable group delay therealong. Therefore, the fiber Bragg grating segments included in different portions along the first and second reflectors 30 and 32 have different group delay characteristics, which affects the duration of laser light pulses produced using the tunable laser 10. Also, pulse characteristics other than the duration of the laser light pulses can be modified by selecting suitable group delays for fiber Bragg grating segments included in the first reflector first and second portions 34 and 36.

In yet other embodiments of the invention, the position of the second reflector first and second portions 38 and 40 is reversed with respect to the gain medium 18 while the first reflector first and second portions 34 and 36 remain in the same position. In these embodiments, wavelength selection of the laser light 12 is permitted by spacing apart the second reflector first and second portions 38 and 40 from each other by a greater distance than the distance by which the first reflector first and second portions 34 and 36 are spaced apart from each other. When chirped fiber Bragg gratings are used in the first and second reflectors 30 and 32, different group delay slopes are produced, and the laser operates with a group velocity dispersion that is the difference between the two group delay slopes. A mix between a soliton laser and a normal dispersion laser is thus formed that reduces or eliminates Kelly's side bends.

In some embodiments of the invention, the gain medium 18 includes a doped gain fiber. Such doped gain fibers are well known in the art and will therefore not be described in further details. It is also within the scope of the invention to manufacture tunable lasers 10 using any other suitable gain medium 18. Also, the pump light source 14 is any suitable pump light source 14 that can emit pump light that allows the gain medium 18 to produce the laser light 12 having both the first and second wavelengths. For example, the pump light source 14 includes a light emitting diode.

The pump light input port 20 is also any suitable pump light input port 20. For example, the pump light input port 20 includes a wave division multiplexer (WDM) that allows light having the first and second wavelengths to be freely transmitted, or substantially freely transmitted therethrough but which, through optical isolators or any other suitable means, substantially prevents light, and especially the laser light 12, from being transmitted back towards the pump light source 14. The WDM also allows for receiving pump light emitted by the pump light source 14 and transmitting this pump light into the optical resonator 16 and, more specifically, into the gain medium 18.

The optical intensity modulator 22 is any suitable component allowing variations in the transmission of the laser light 12 having the first and second wavelengths therethrough. Typically, the optical intensity modulator 22 takes the form of a component that is coupled to and inserted between the chirped fiber Bragg grating forming the first reflector 30 and the WDM multiplexer forming the pump light input port 20. However, any other physical configurations of the optical intensity modulator 22 are within the scope of the invention. In some embodiments of the invention, the optical intensity modulator 22 includes an electro-optic modulator.

In some embodiments of the invention, the optical intensity modulator 22 is a component that allows the laser light 12 to pass therethrough with two different absorption levels. For example, one level allows substantially all the light incoming at the optical intensity modulator 22 to pass therethrough. At a second level, a predetermined fraction of the light incoming at the optical intensity modulator 22 is not transmitted. In these embodiments, periodically changing the absorption coefficient of the optical intensity modulator 22 between the first level and the second level preferentially selects a laser light pulse that travels through the optical resonator 16 as described hereinabove.

The reader skilled in the art will readily appreciate that the optical intensity modulator 22 need not absorb all or a large fraction of the light circulating within the tunable laser 10 for the mode locking effect provided by the optical intensity modulator 22 to be provided. Indeed, only relatively small variations in the absorption coefficient are sufficient in some embodiments of the invention to produce the desired effect.

In some embodiments of the invention, the optical intensity modulator 22 includes a variable attenuation modulator. In opposition to the previously described optical intensity modulator, the variable attenuation modulator allows for a substantially continuous variation in the absorption coefficient of the optical intensity modulator 22 over a predetermined absorption range. In this embodiment, the power of the laser light 12 may therefore be regulated using the optical intensity modulator 22, in addition to being regulated using the power of the pump light source 14.

As illustrated in FIG. 1, in some embodiments of the invention, the tunable laser 10 includes a controller 42 for controlling the modulation period of the optical intensity modulator 22. Typically, fiber Bragg gratings, such as the fiber Bragg gratings usable in the first and second reflectors 30 and 32, do not have ideal, theoretically predictable, reflection spectra at different locations therealong due to manufacturing defects. However, once a fiber Bragg grating has been characterized, it is possible to map the distance from one end of the fiber Bragg grating to each location therealong and to associate with each of these locations a specific wavelength that is reflected. Therefore, by characterizing the first and second reflectors 30 and 32 in this manner, the controller 42 can be programmed to select precisely the wavelength at which the laser light 12 will be emitted for a specific tunable laser 10 as the modulation period can then be selected to achieve this wavelength.

Also, the group delay characteristics of chirped fiber Bragg gratings are not perfect. Imperfections create a group delay ripple which may cause unwanted effects in the pulsed laser light 12. A ratio between the group delay ripple and the group delay as a function of frequency is herein referred to as the ratio spectrum. The pulses of laser light 12 produced by the tunable laser 10 have a pulse spectrum. It is preferable to manufacture the chirped Bragg gratings with sufficient precision that the ratio spectrum is substantially disjoint from the pulse spectrum. In other words, regions of the ratio spectrum in which there is a significant power should be separate from regions of pulse spectrum at which there is a significant power.

Figure 2:
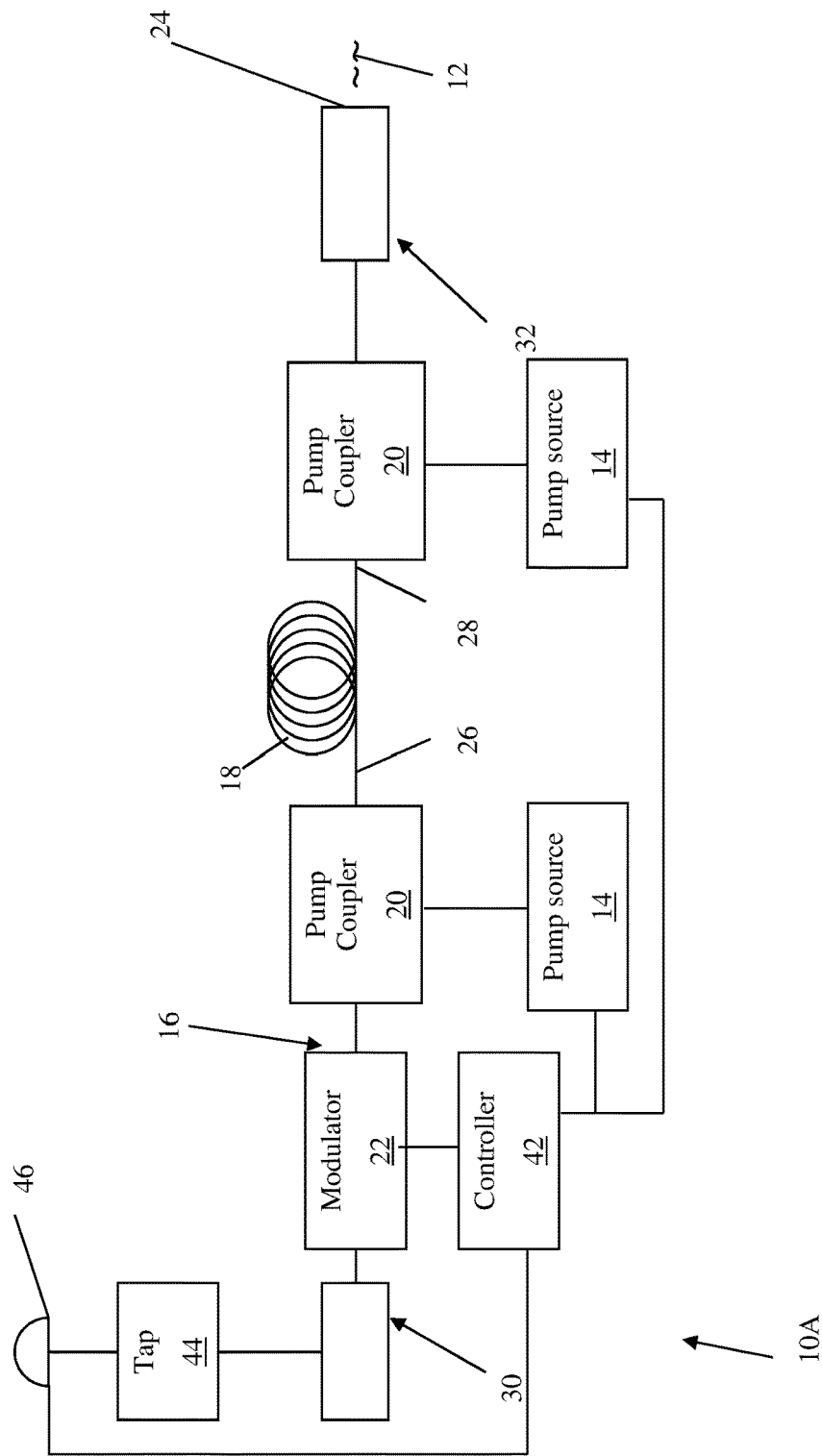
FIG. 2, in a schematic view, illustrates a tunable laser usable with an alternative embodiment of the present invention.

FIG. 2 illustrates an alternative tunable laser 10A. The tunable laser 10A has many components that are substantially similar to those of the tunable laser 10. These components will therefore not be described in further details.

As seen from FIG. 2, the tunable laser 10A differs from the tunable laser 10 in that it includes two pump light sources 14, each coupled to the gain medium 18 through a respective pump light input port 20. Also, it is within the scope of the invention to have more than two pump light sources 14. In addition, a tap 44 is provided, for example at an end of the first reflector 30 opposed to the gain medium 18, so that a photodiode 46, or any other suitable light intensity measurement device, can be used to measure the taped light and feed this light intensity to the controller 42. The controller 42 is therefore connected to the photodiode 46 so that light intensity measurements can be transmitted by the photodiode 46 to the controller 42. The controller 42 is also operatively coupled to the pump light source 14 for controlling the intensity of the pump light. The controller 42 is then used in a feedback loop to control the power provided by the pump light sources 14 in response to light intensity measurements to obtain a predetermined power for the laser light 12.

Figure 3:
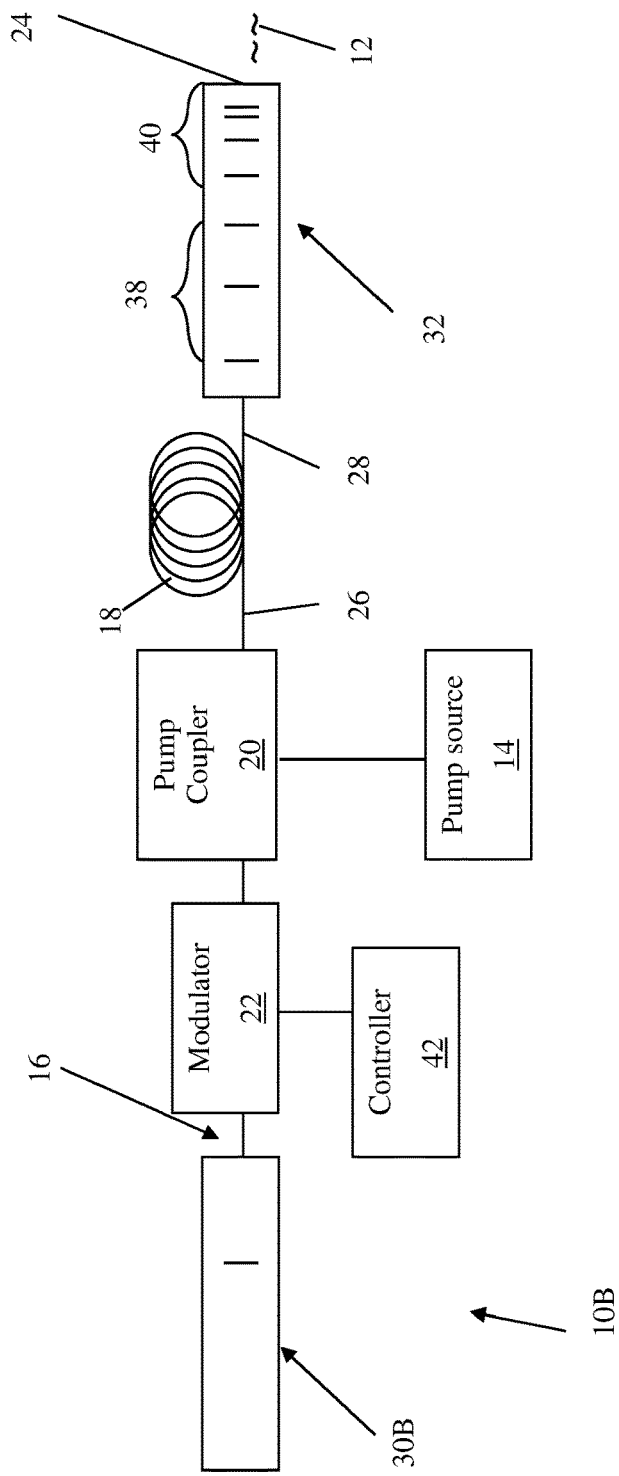
FIG. 3, in a schematic view, illustrates a tunable laser usable with another alternative embodiment of the present invention.

FIG. 3 illustrates yet another tunable laser 10B. The tunable laser 10B being similar also to the tunable laser 10. A difference that occurs in the tunable laser 10B is that an alternative first reflector 30B is used. The alternative first reflector 30B is such that the first reflector 30B reflects the laser light 12 having both the first and second wavelengths at substantially similar first reflector-to-modulator distances from the optical resonator 16. For example, this is achieved by using a mirror instead of a fiber Bragg grating in the first reflector 30B. In yet other embodiments of the invention, the first reflector 30B is replaced by an optical circulator or a loop of optical fiber that returns all incoming light toward the second reflector 32.

Figure 4:
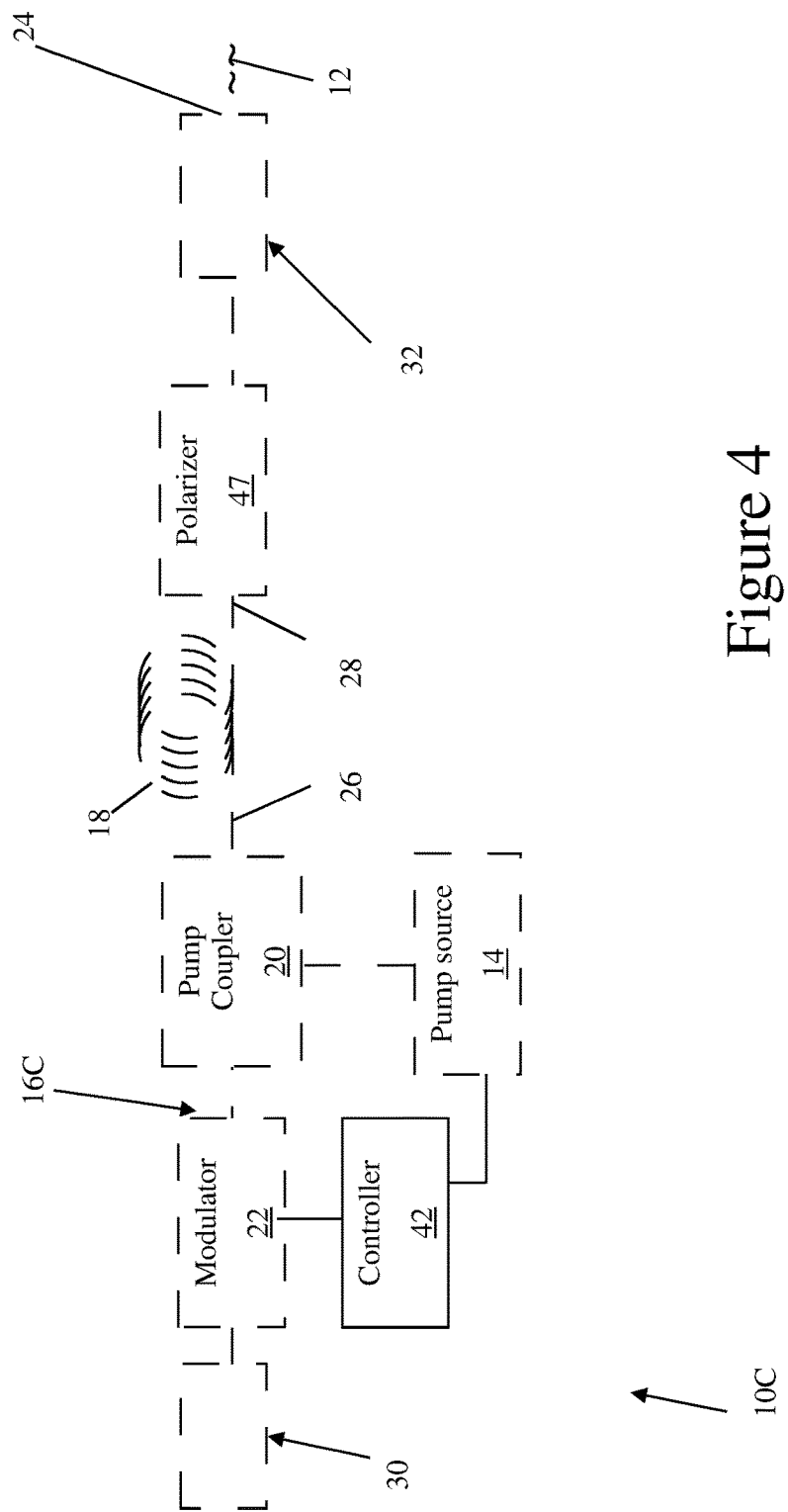
FIG. 4, in a schematic view, illustrates a tunable laser usable with yet another alternative embodiment of the present invention.

FIG. 4 illustrates yet another tunable laser 10C in which the optical resonator 16, the gain medium 18 and optical intensity modulator 22 are all polarization maintaining, as illustrated by the dashed representation of these components. Therefore, the tunable laser 10C is able to produce polarized laser light 12. To select the polarization, a polarizer 47 is inserted in the optical resonator 16C for polarizing the laser light 12.

Figure 5:
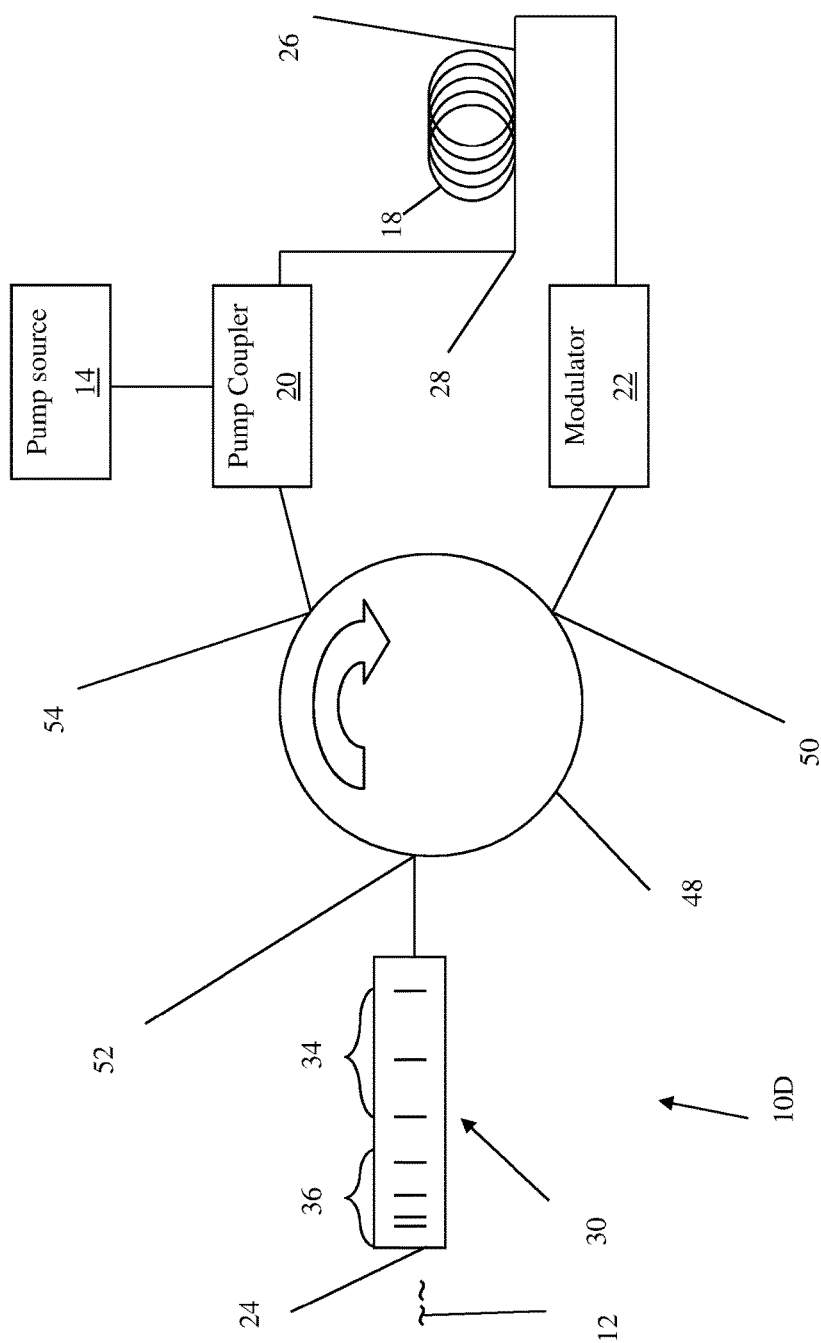
FIG. 5, in a schematic view, illustrates a tunable laser usable with yet another alternative embodiment of the present invention.

FIG. 5 illustrates yet another tunable laser 10D. The tunable laser 10D uses only a single reflector 30 instead of the first and second reflectors 30 and 32. The resonance in the optical resonator 16D is provided by using an optical circulator 48. The optical circulator 48 includes a circulator first port 50, a circulator second port 52 and a circulator third port 54. The optical circulator 48 is configured in a manner such that the laser light incoming at the circulator first port 50 is emitted at the circulator second port 52, laser light incoming at the circulator second port 52 is emitted at the circulator third port 54 and laser light incoming at the circulator third port 54 is emitted at the circulator first port 50. The circulator first port 50 is optically coupled to the gain medium 18 through the gain medium first end 26 with the optical intensity modulator 22 inserted between the gain medium first end 26 and the circulator first port 50. The circulator second port 52 is optically coupled to the reflector 30 and the circulator third port 54 is optically coupled to the gain medium 18 through the gain medium second end 28 with the pump light input port 20 inserted between the gain medium second end 28 and the circulator third port 54. The reflector 30 is a reflector similar to the first and second reflectors 30 and 32 and has a structure and a function substantially similar to that of the first and second reflectors 30 and 32. In this embodiment, the reflector 30 allows for the emission of the laser light 12 by the laser 10D by letting a portion of the laser light 12 to be transmitted through the reflector 30. In this embodiment of the invention, a unidirectional loop is created, which reduces losses in the tunable laser 10D caused by the optical intensity modulator 22.

Figure 6:
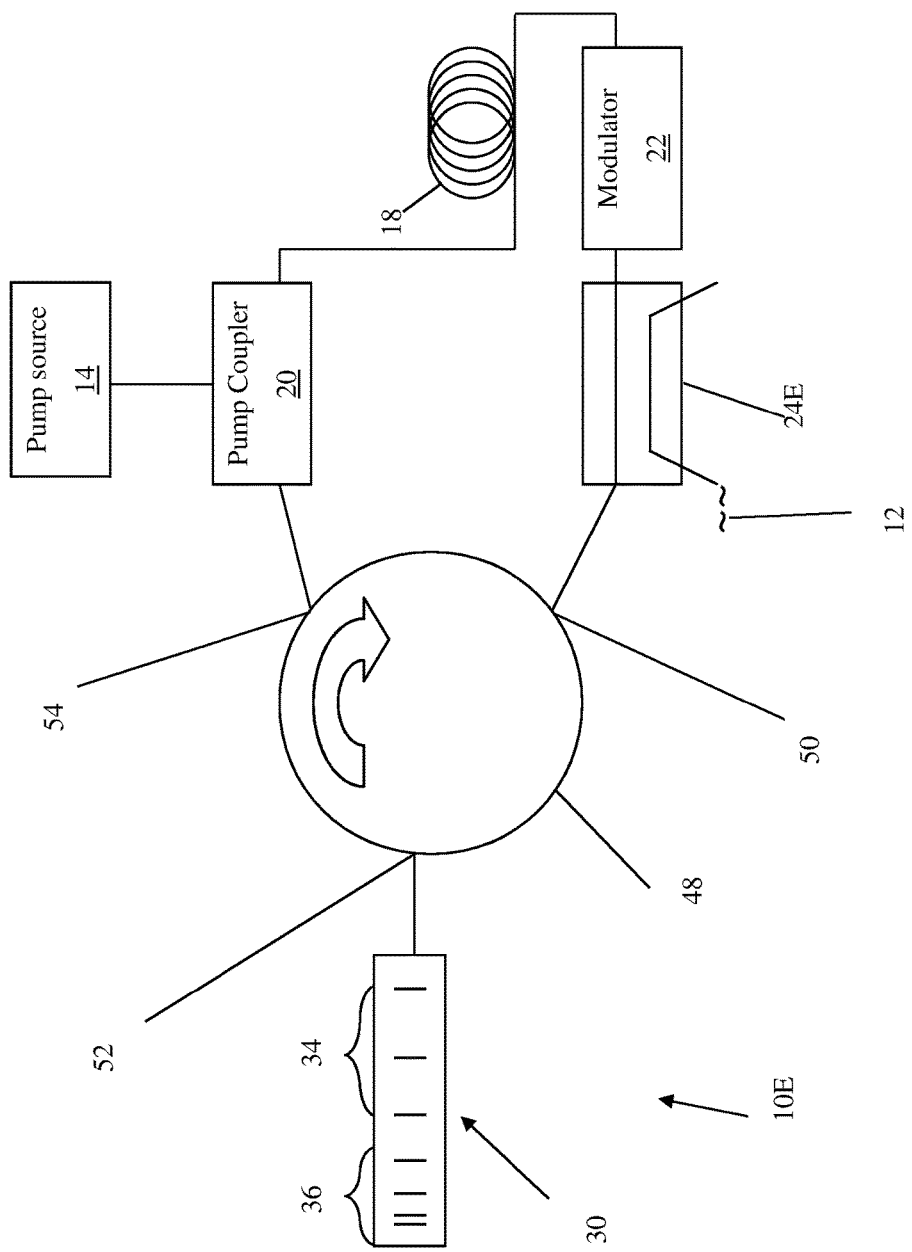
FIG. 6, in a schematic view, illustrates a tunable laser usable with yet another alternative embodiment of the present invention.

In yet another embodiment of the invention, a tunable laser 10E shown in FIG. 6 is provided. The tunable laser 10E includes an alternative output port 24E inserted between the optical intensity modulator 22 and the circulator first port 50. The tunable laser 10E has a configuration substantially similar to the configuration of the tunable laser 10D, with the exception that the reflector 30 is highly reflective and, therefore, does not allow for laser light 12 to be transmitted therethrough. Instead, an output port 24E in the form of a fiber coupler or, in other words, a tap, is provided for tapping into the tunable laser 10E and therefore releasing the tunable laser light 12.

Figure 7:
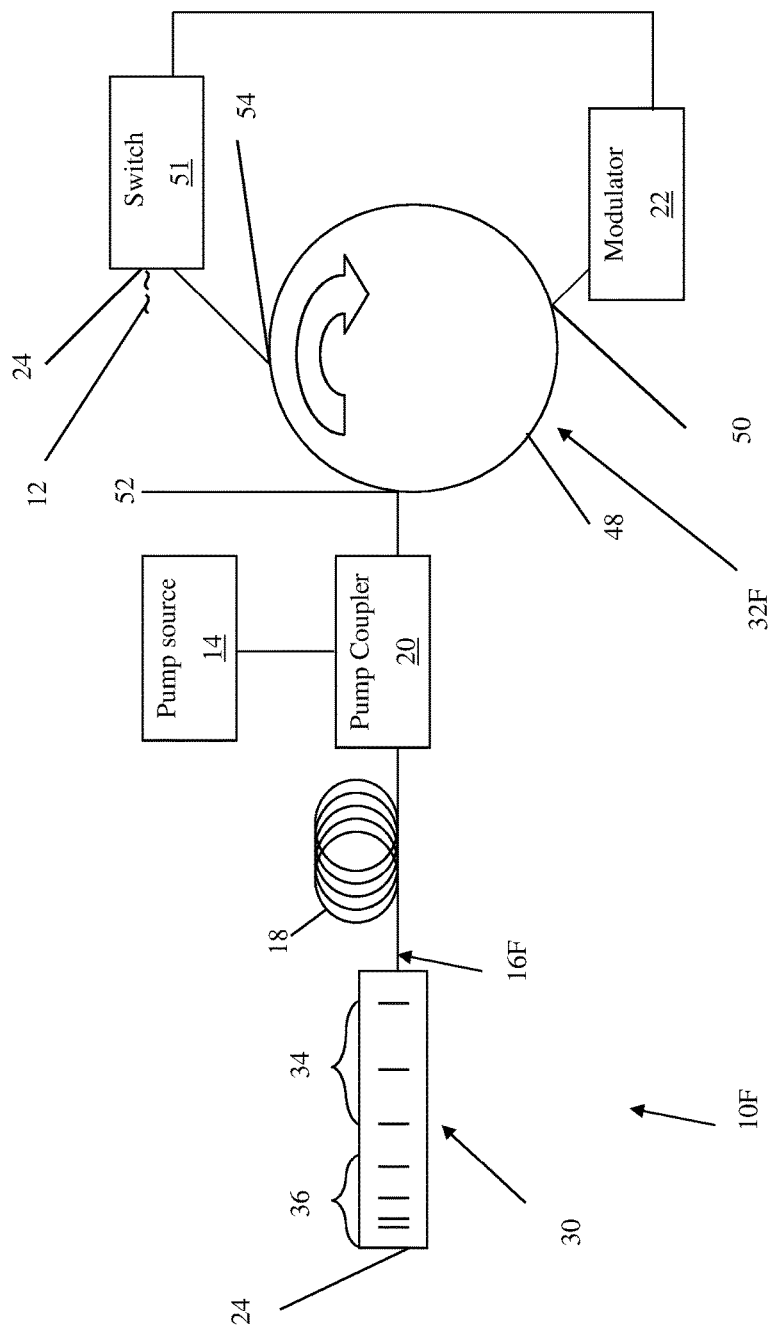
FIG. 7, in a schematic view, illustrates a tunable laser usable with yet another alternative embodiment of the present invention.

FIG. 7 illustrates yet another geometry for a tunable laser 10F in which the second reflector 32F includes an optical circulator 48 for receiving the laser light 12 from the gain medium 18 and returning the laser light back 12 to the gain medium 18. In this embodiment, the circulator first port 50 is optically coupled to the circulator third port 54 with an optical switch 51 and the optical intensity modulator 22 inserted therebetween. The circulator second port 52 is optically coupled to the first reflector 30 with the gain medium 18 and the pump light input port 20 inserted therebetween. Advantageously, various optical components can be inserted in the loop formed between the circulator first and third ports 50 and 54 to allow emission of the laser light 12, modulation of the intensity of the laser light 12 and any other conditioning or characterization of the laser light 12.

The optical switch 51 defines the output port 24F and is usable for selectively releasing the laser light 12 from the optical resonator 16F and confining the laser light 12 in the optical resonator 16F. More specifically, in one state of the optical switch 51, all the light incoming at the switch 51 is fed back into the optical resonator 16F. This allows for build up of laser light power inside the optical resonator 16F. When a pulse is to be let out of the optical resonator 16F, the switch 51 is switched to the other state in which a part or all of the light incoming at the switch 51 is output at another port that forms the output port 24F.

The reader skilled in the art will readily appreciate that in alternative embodiments of the invention, the tunable lasers 10D, 10E and 10F have an optical intensity modulator 22 that is located at any suitable location between the circulator first and third ports 50 and 54. In other words, the exact position of the optical intensity modulator 22 in the loop formed between the circulator first and third ports 50 and 54 can be varied along this loop while achieving tunable lasers that perform satisfactorily. In yet other embodiments of the invention, the various components of the tunable lasers 10D, 10E and 1OF are configured in any suitable order as long as an optical resonator is formed. Also, the pump light can travel either in the direction of the laser light or in the opposite direction.

Figure 8:
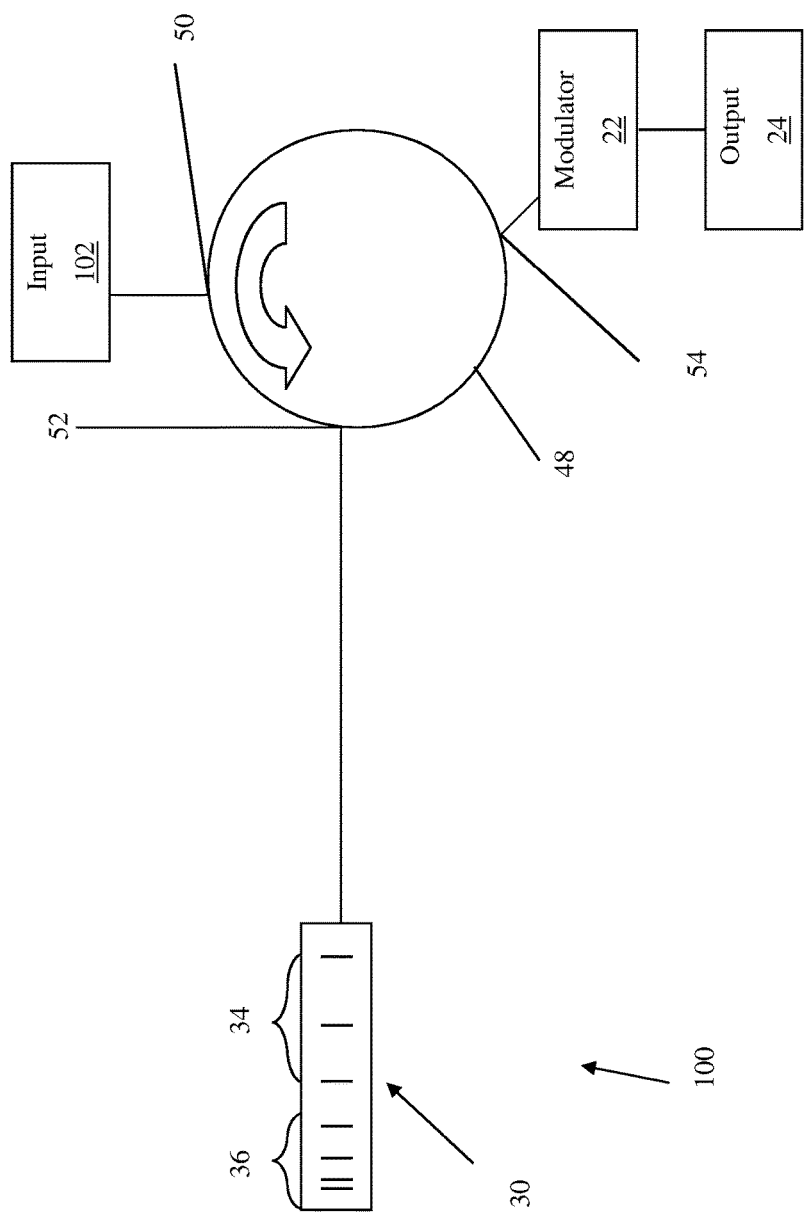
FIG. 8, in a schematic view, illustrates an apparatus usable for arbitrarily shaping the spectrum of a pulse of light.

Referring to FIG. 8, there is shown an apparatus 100 for arbitrarily shaping the spectrum of a pulse of light. In some embodiments of the invention, the apparatus 100 is inserted at a suitable location in the tunable lasers 10 to 10F to provide laser light pulses having an arbitrary spectrum.

The apparatus 100 includes an optical circulator 48. The optical circulator 48 includes a circulator first port 50, a circulator second port 52 and a circulator third port 54. The optical circulator 48 is configured in a manner such that light incoming at the circulator first port 50 is emitted at the circulator second port 52, and light incoming at the circulator second port 52 is emitted at the circulator third port 54. The circulator first port 50 is optically coupled to an input port 102 used for receiving laser light. The circulator second port 52 is optically coupled to a reflector 30, such as a chirped Bragg grating, that reflects light having different wavelengths at different locations therealong, and the circulator third port 54 is optically coupled to an optical modulator 22. The optical modulator 22 is optically coupled to an output port 24 usable for releasing the light modulated by the optical modulator 22.

The reflector 30 spreads temporally the different frequencies comprised in the light incoming at the input port 102. Therefore, by suitable modulation of the absorbance of the optical modulator 22 as a function of time, light having any desired spectrum is achievable. Also, each successive pulse of light incoming at the input port 102 can be shaped differently. In some embodiments of the invention, the output port 24 is optically coupled to an optical component having a dispersion inverse that of the reflector 30, thereby temporally compressing the spectrally shaped pulse.

It should be noted that in alternative embodiments of the invention, any component that spreads temporally light having different frequencies is usable instead of the reflector 30.

Figure 9:
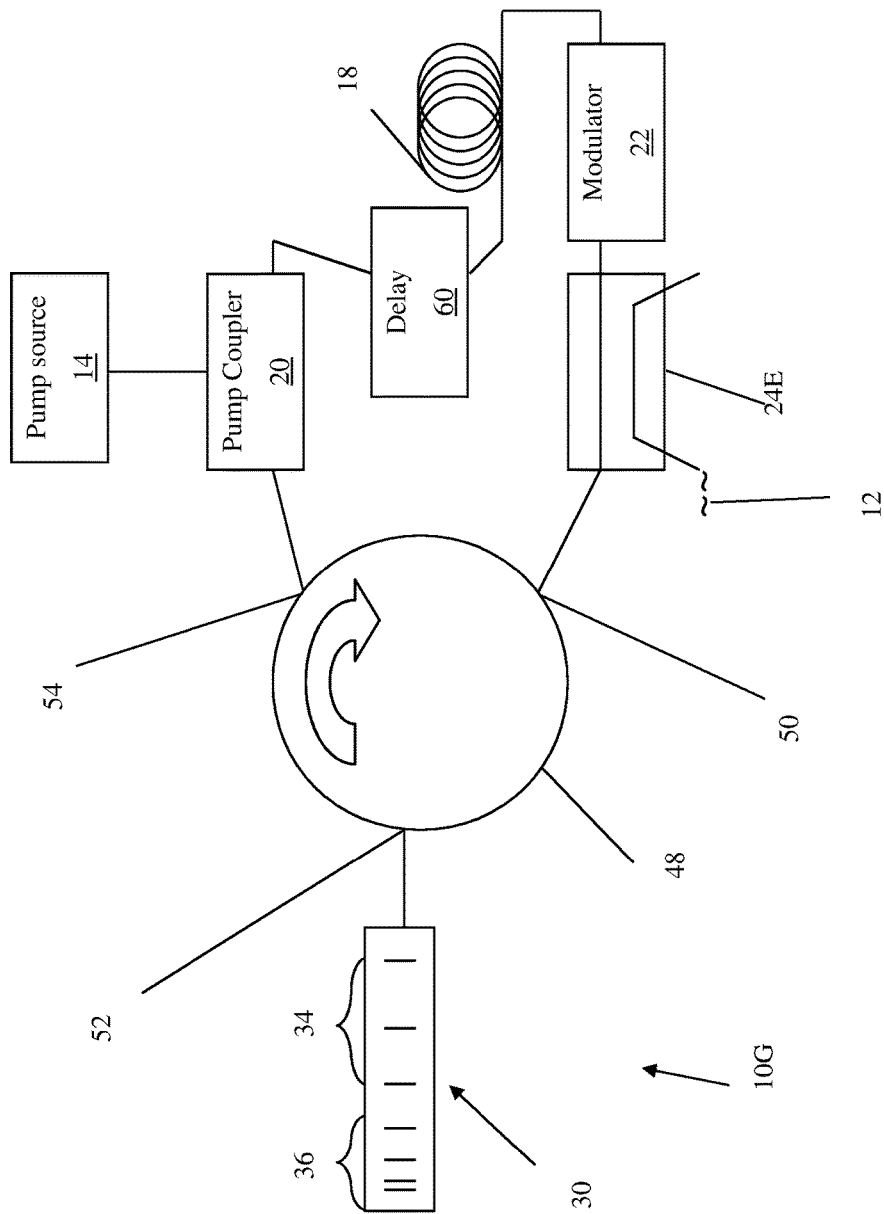
FIG. 9, in a schematic view, illustrates a tunable laser usable with yet another alternative embodiment of the present invention.

In yet another embodiment of the invention, a tunable laser 10G shown in FIG. 9 is provided. The tunable laser 10G is similar to the tunable laser 10E shown in FIG. 6. However, a delay element 60 is inserted at any suitable location in the resonator of the laser 10G for delaying, or changing the phase, of the light that passes through the delay element 60. For example, the delay element 60 is inserted between the pump coupler 20 and the gain medium 18. The delay element 60 changes the pulse frequency/light wavelength relationship of the tunable laser 10G. If the delay element 60 is a variable delay element, this relationship can be adjusted to any needed relationship. For example, the delay could be selected so that all wavelengths emitted by the tunable laser 10G have the same pulse frequency.

Figure 10:
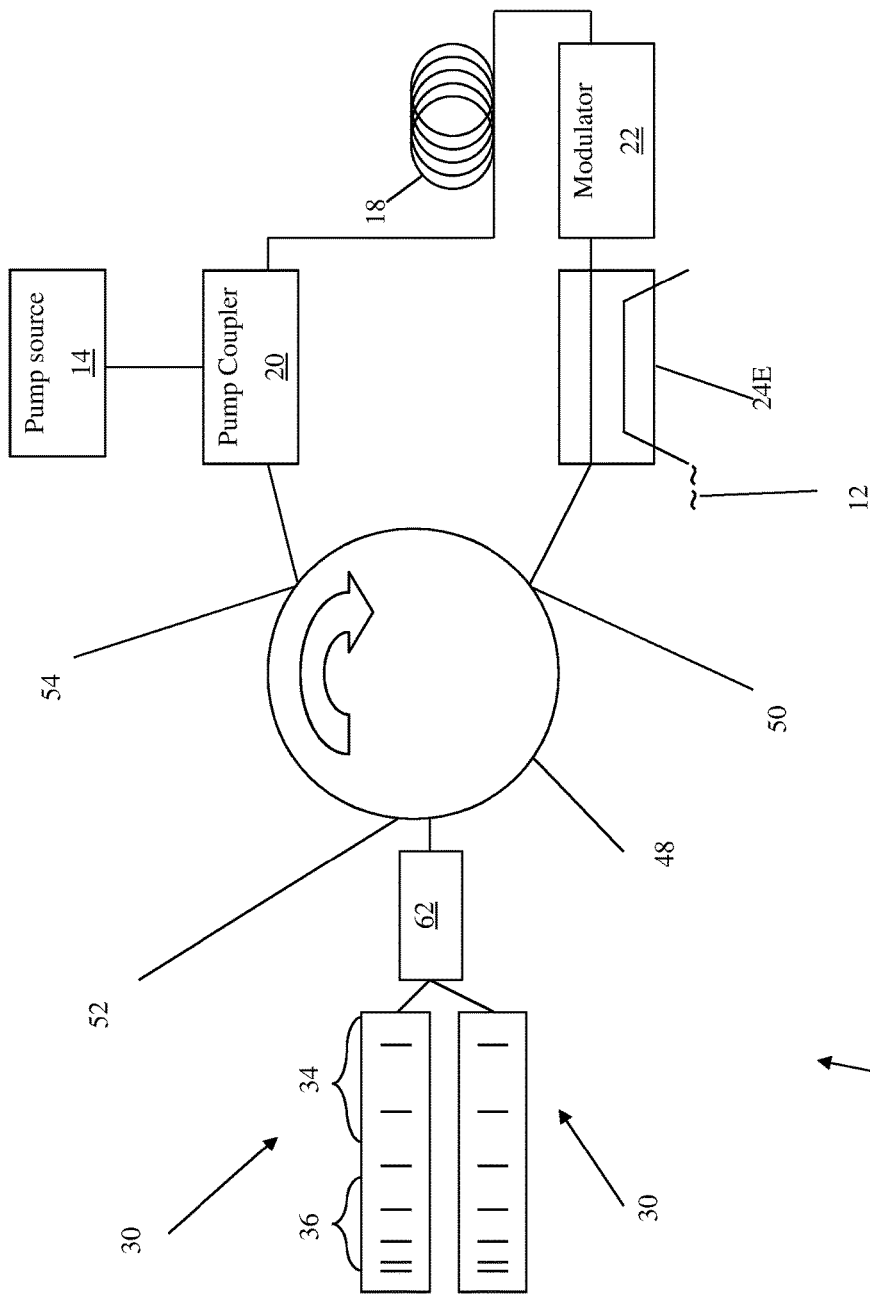
FIG. 10, in a schematic view, illustrates a tunable laser usable with yet another alternative embodiment of the present invention.

In yet another embodiment of the invention, a tunable laser 10H shown in FIG. 10 is provided. The tunable laser 10H is similar to the tunable laser 10E shown in FIG. 6. However, many reflectors 30 are used in parallel, instead of a single one. Each of the reflectors 30 reflects a different wavelength for a given resonating cavity length. This creates a laser in which pulses of laser light including many different wavelengths are created, all the wavelengths being synchronized. While two reflectors are shown in the drawings, any suitable number of reflectors is usable. The reflectors 30 are coupled to the remainder of the tunable laser 10H using any suitable coupler 62, such as, for example, a wavelength division multiplexer. In other similar embodiments of the invention, the reflectors 30 reflecting different wavelengths are embodied in a single component, for example as superposed Bragg gratings in a single optical fiber.

In yet another example of a multi-wavelength laser, a laser having a structure similar to the one of the lasers 10 or 10A to 10F produces pulses including many wavelengths by having their reflectors (reflecting exclusively each light having a respective wavelength) create cavities of different lengths for different wavelengths, the lengths being such that round-trip travel times for all wavelengths are all integer multiples of a base period. By suitably selecting the frequency at which the optical intensity modulator 22 is modulated, simultaneous production of light pulses at all the wavelengths is possible. For example, if a cavity of a base length is created for a first wavelength and a cavity of double the base length is created for a second wavelength, modulating the optical intensity modulator at a speed required to create pulses at the first wavelength automatically allows creation of pulses at the second wavelength.

By selecting appropriate wavelengths for pulses circulating in the optical resonator and the delays (or phase difference) between them, it is possible to synthesise resulting total pulses having arbitrary shapes. In some embodiments of the invention, the resulting pulse is reflected by a chirped fiber Bragg grating prior to use to compress the resulting total pulse.

Another application of multi-wavelength lasers such as those described hereinabove resides in the possibility to build up simultaneously within the optical resonator laser light having many different wavelengths. Since many wavelengths are present, switching the operation of the laser from one wavelength to the other is facilitated as stabilisation of the laser for emission at each successive wavelength is already in part completed.

In the above-described tunable lasers 10 to 10H, using suitable components allows for variations in the duration of the laser light pulses by varying the intensity of these laser light pulses. In turn, this intensity is adjustable by varying many controllable variables, such as the duration and time evolution profile of the optical intensity modulation provided by the optical intensity modulator 22 and the power provided by the pump light source 14. In some embodiments, the first reflector 30, the second reflector 32 or both the first and second reflectors 30 and 32 have an adjustable dispersion, which is then also usable to change the laser light pulses shape and duration. It should be noted that the variations in the pulse duration is achievable without changing the pulse repetition frequency.

While some embodiments of a tunable laser have been described hereinabove, it is within the scope of the invention to have many other variants. Also, it is within the scope of the invention to use many concepts associated with lasers to operate the proposed tunable lasers in different operation ranges. For example, the proposed laser may be Q switched and, as described hereinabove in a specific embodiment, cavity dumping may be used.

Figure 11:
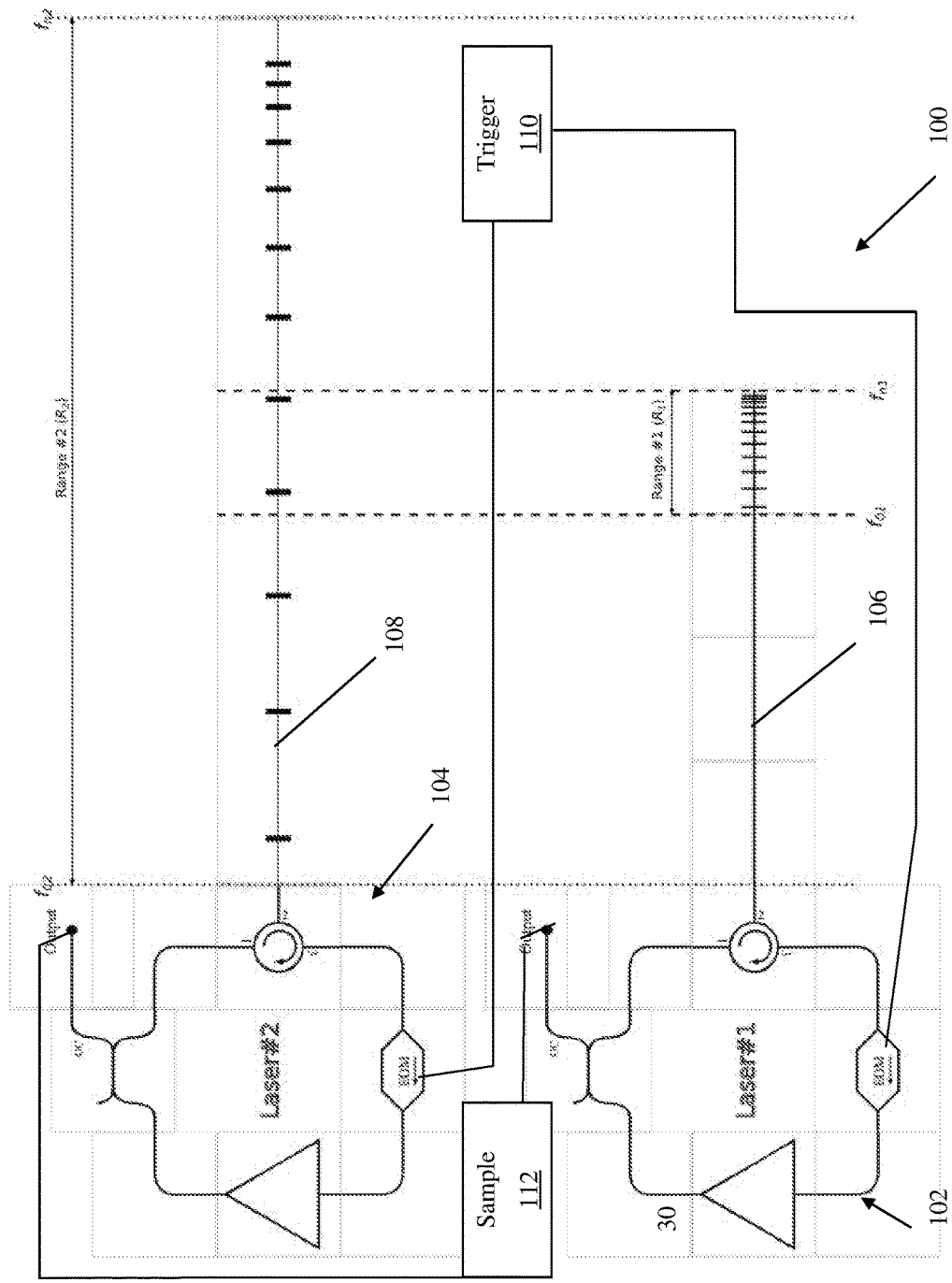
FIG. 11, in a schematic view, illustrates a synchronized laser system in accordance with an embodiment of the present invention.

FIGS. 11 to 14 illustrate synchronized laser systems in accordance with various embodiments of the present invention. With reference to FIG. 11, a first synchronized laser system 100 includes first and second tunable mode-locked lasers 102 and 104 and a trigger 110. Any suitable tunable mode-locked laser 102 and 104 is usable, for example the lasers 10 to 10H described hereinabove, among other possibilities.

The trigger 110 is operative to issue first and second trigger signals respectively to the first and second tunable mode-locked lasers 102 and 104, the first and second trigger signals being periodic and emitted at a common adjustable frequency with a predetermined delay therebetween. The adjustable frequency is included in a predetermined frequency interval. The predetermined delay may be frequency-dependent or fixed for any system. The predetermined delay corrects, among other factors, for the variations in properties of the first and second tunable mode-locked lasers 102 and 104 between different synchronized laser systems 100. The predetermined delay is such that the first and second laser light pulses are emitted so as to arrive substantially simultaneously in a sample 112. In other words, the predetermined delay may also compensate in some embodiments for variations in propagation delays between the first and second tunable mode-locked lasers 102 and 104 and the sample to illuminate. Such delays may be caused by optical fibers or any other optical components guiding the first and second pulses to the sample 112, among other possibilities.

The delay between the first and second trigger signals may be created by duplicating an initial trigger and delaying the duplicated trigger in any suitable manner while not delaying the initial trigger. Such delays are well-known in the art and manners of achieving them are not further described.

The first and second tunable mode-locked lasers 102 and 104 are operative for emitting respectively first and second laser light pulses in response to receiving respectively a first and second trains of the first and second trigger signals. The first and second wavelengths of respectively the first and second laser light pulses are dependent on the adjustable frequency of the first and second trigger signals in accordance respectively with first and second wavelength-frequency relationships. The first and tunable mode-locked lasers 102 and 104 are operative over respectively first and second repetition rate ranges part of the predetermined frequency interval to produce the first and second laser light with the first wavelength within a first laser tuning range and the second wavelength within a second laser tuning range. The first and second wavelength-frequency relationships are selected to result in a predetermined relationship between the first and second wavelengths at each adjustable frequency from the predetermined frequency interval at which the first and second repetition rate ranges overlap. Outside of the first and second repetition rate ranges, in some embodiments, there is no laser light produced by the first and second tunable mode-locked lasers 102 and 104.

For example, the first and second tunable mode-locked lasers 102 and 104 are similar to the laser 10E described hereinabove. However, any other suitable dispersion-tuned actively mode-locked lasers (DTAML) are usable. The remainder of this document, unless mentioned otherwise, refers to the specific case in which the first and second tunable mode-locked lasers 102 and 104 are similar to the laser 10E to simplify the description of the system 100. In this case the first and second trigger signals are sent to the optical intensity modulator 22 to trigger the change in optical absorption. For brevity, the first and second unable mode-locked lasers 102 and 104 are referred hereinbelow simply as lasers 102 and 104.

In FIG. 11, the first reflectors 106 and 108 of the first and second lasers 102 and 104 are chirped fiber Bragg gratings, corresponding to the reflector 30 of FIG. 6. The first and second reflectors 106 and 108 are not drawn necessarily to scale, but longer elements in FIG. 11 correspond to longer elements in the physical embodiment of the system 100. Similarly, the spacing of the short vertical bars shown on each of the first and second reflectors 106 and 108, which represent fiber Bragg gratings, reflects the physical embodiment of the system 100, once again not to scale, with closer bars representing portions of the first and second reflectors 106 and 108 that reflect shorter wavelengths.

For both the first and second lasers 102 and 104 to have the same repetition rate, they need to have the same cavity length or the cavity lengths need to be integer multiples of each other. Cavity length is indicated by travel time of light in the lasers. In other words, in cases in which optical fibres are used, the physical dimension of the cavity is not the important factor, but the travel time in the cavity is the critical factor. Indeed, depending on the type of fiber used in each of the first and second lasers 102 and 104, and of the wavelength of the light circulating therein, the cavities may have require different physical dimensions to achieve a given propagation time over the cavity.

A particularity of DTAML is that they operate over a range of repetition rates because their laser cavity is dispersive (that is, the different wavelengths have different propagation times in the cavity). Let us name that range of repetition rates $R_1$ for laser 102, which corresponds to the first repetition range, and $R_2$ for laser 102, which corresponds to the second repetition range (each range $R_x$ starts at repetition rate $f_0$ and ends at $f_n$ which correspond respectively to wavelengths of the laser light pulses $\lambda_0$ and $\lambda_v$). So to synchronize two DTAMLs, we need to overlap their repetition rate ranges. If the ranges partially overlaps, we can only partly tune both lasers over the common repetition rates—outside of this zone, only one (or no) laser will operate. One way to be sure that one laser (for example laser 102) operates over its whole tuning range without the stringent condition of equalizing exactly both cavity lengths, is to make sure that its repetition rate range is smaller than the repetition rate range of the other laser (in this example, laser 104) ($R_1 < R_2$) as shown in FIG. 11. When synchronizing two DTAMLs, the laser 102 that tunes over its whole tuning range must have a smaller repetition rate range than the other laser(s). This accomplish by having the product of the magnitude of the net dispersion ($|D|$)×tuning range ($\Delta\lambda$) of laser 102 be smaller than that of laser 104 ($|D_1|\cdot\Delta\lambda_1 < |D_2|\cdot\Delta\lambda_2$). More generally, it is advantageous in some embodiments to have the second wavelength-frequency relationships such that the first wavelength varies less as a function of the adjustable frequency than the second wavelength over the predetermined frequency interval so that over the predetermined frequency interval, the second wavelength varies more than the first wavelength.

When we change the repetition rate, both DTAMLs will tune their frequency simultaneously. An interesting case is to have one of the DTAML operate at a quasi-fixed wavelength while the other laser's wavelength is tuning. For example, the second wavelength varies at least 100 times more slowly than the first wavelength as function of the adjustable frequency. Therefore, in this case, the relationship between the first and second wavelengths is that the second wavelength remains substantially constant when the first wavelength is changed. If we still want to tune laser 102 over its whole tuning range, let us have laser 104 operating at a quasi-fixed wavelength. In this case, the overlap condition ($|D_1| \cdot \Delta\lambda_1 < |D_2| \cdot \Delta\lambda_2$) still applies. To have laser 104 quasi-fixed, we limit its tuning range ($\Delta\lambda_2 << \Delta\lambda_1$). To satisfy the overlap condition, we must have ($|D_2| >> |D_1|$). To synchronize two DTAMLs and have one of those lasers operate at a quasi-fixed wavelength regardless of the repetition rate, the dispersion of this laser must be very high.

This asymmetry in the rates of variation of wavelength as a function of the repetition rate of the trigger 110 is useful in many situations. For example, the sample 112 defines an interaction bandwidth of interest including wavelengths over which a predetermined light-matter interaction occurs, the second laser tuning range being within the interaction bandwidth. In a specific example, the predetermined light-matter interaction including a non-linear light-matter interaction occurring in the interaction bandwidth of interest. For instance, two broad classes of material with such nonlinear interactions are nonlinear crystals and molecular nonlinearity. Nonlinear crystals presenting $X^{(2)}$ nonlinearity will convert the wavelengths from the first laser 102 and the second laser 104 through sum-frequency generation or difference frequency generation to a third wavelength that is respectively lower or higher than the wavelengths of both lasers 102 and 104. Among such crystals are $AgGaSe_2$, $AgGaS_2$, GaAs and GaSe crystals. A very specific example of a non-linear material would be a frequency doubling material, such as Lithium Niobate crystals ($LiNbO_3$), Barium Borate crystals ($BaB_2O_4$) or Potassium Titanyl Phosphate crystals ($KtiOPO_4$). Such frequency-doubling materials are operative for producing light having a third wavelength that is half the second wavelength when illuminated with the second laser light pulses. Many such materials have a relatively small wavelength bandwidth over which frequency doubling occurs, for example a few nanometers, and in some cases as small as one nanometer. Another other class of material is any molecular substance having a $X^{(3)}$ Raman gain spectrum. The wavelengths of both lasers 102 and 104 will generate a third wavelength if their difference (in energy) matches the gain. Most gases and organic compounds have distinctive Raman spectra. The present invention is well suited to Coherent Antistokes Raman Spectroscopy (CARS) in which molecular spectra are obtained when two laser pulses having different wavelengths interact in a material, with the difference between the wavelength being varied. For example, this may be performed by keeping the second wavelength of the second laser 104 fixed, or almost fixed, and varying the first wavelength of a first laser 102. In another example (not shown in the drawings), instead of having the sample including the non-linear material, the non-linear material is inserted between the second laser 104 and the sample 112.

As seen in FIG. 11, typically the first and second wavelength-frequency relationships are such that the first and second wavelengths are respectively a first and a second monotonous function of the adjustable frequency. A monotonous function is such that as the independent variable increases, the dependent variable never decreases or never increases.

Figure 12:
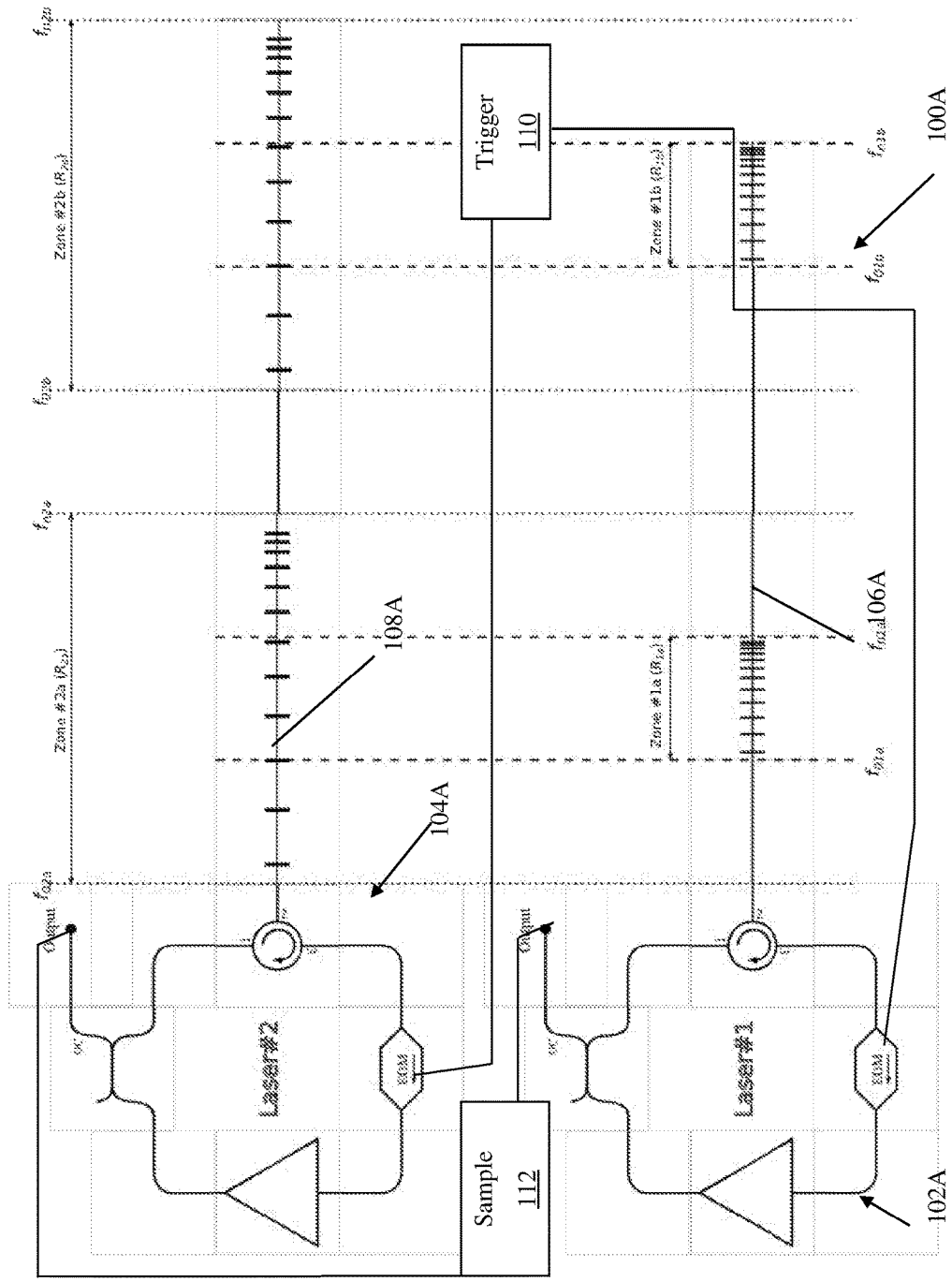
FIG. 12, in a schematic view, illustrates a synchronized laser system in accordance with an alternative embodiment of the present invention.
Figure 13:
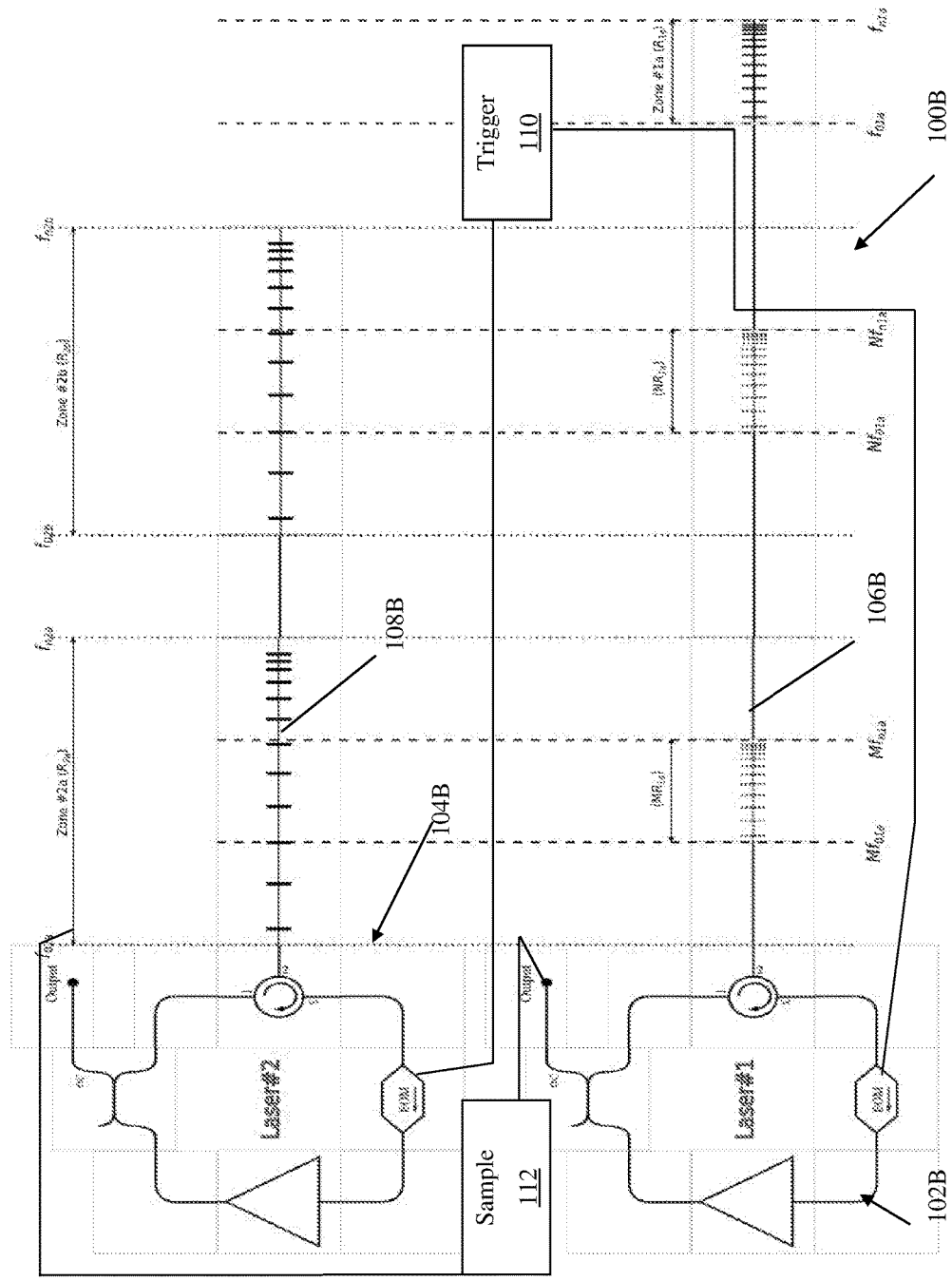
FIG. 13, in a schematic view, illustrates a synchronized laser system in accordance with another alternative embodiment of the present invention.

We have assumed thus far that both lasers 102 and 104 had one region in their respective first reflectors 106 and 108 where the reflected wavelength changes with repetition rate. However, as seen in FIG. 12 for the system 100A, each laser 102A and 104A can have multiple longitudinally spaced apart zones in their respective first reflectors 106A and 108A where the wavelengths changes with repetition rates (corresponding to various repetition rate ranges $R_m$), whether discrete and separated or being contiguous and continuous. Therefore, different reflector regions are used at different regions of the predetermined frequency interval. It is possible to design each laser 102A and 104A so that zones one laser are paired to zones of the other laser. The pairing can be one-to-one, or one-to-many. The case of a one-to-one pairing is straightforward (FIG. 12): each laser 102A and 104A has two or more zones in the first reflectors 106A and 108A where the overlap condition is satisfied and it is satisfied using a specific zone of laser 102A ($R_{1a}$) and a specific zone of laser 104A ($R_{2a}$) such that neither $R_{1a}$ or $R_{2a}$ are paired with other zones. In some embodiments, as seen in FIG. 12, the predetermined frequency interval defines a first interval region and a second interval region, the first and second wavelength-frequency relationships being such that the first and second wavelengths are respectively monotonous functions of the adjustable frequency over each of the first and second interval regions.

In other embodiments, one or more of the first and second lasers 102 and 104 is able to emit more than one wavelength in each light pulse.

The case of one-to-many pairing (FIG. 13, system 100B) is accomplished by matching the different harmonics of a zone ($n \cdot R_{1a}$) in the first reflector 106B of one laser 102B with different zones in the first reflector 108B of the other laser 104B ($R_{2a}$, $R_{2b}$) such that ($N \cdot R_{1a} = R_{2a}$ and $M \cdot R_{1a} = R_{2b}$) where N and M are integer.

In both cases, we can go from one pairing to another simply by changing the repetition rate of the lasers 102B and 104B. The DTAMLs can be synchronized over multiple zones that either have the same repetition rates (one-to-one pairing) or are harmonic of each others (one-to-many pairing).

Figure 14:
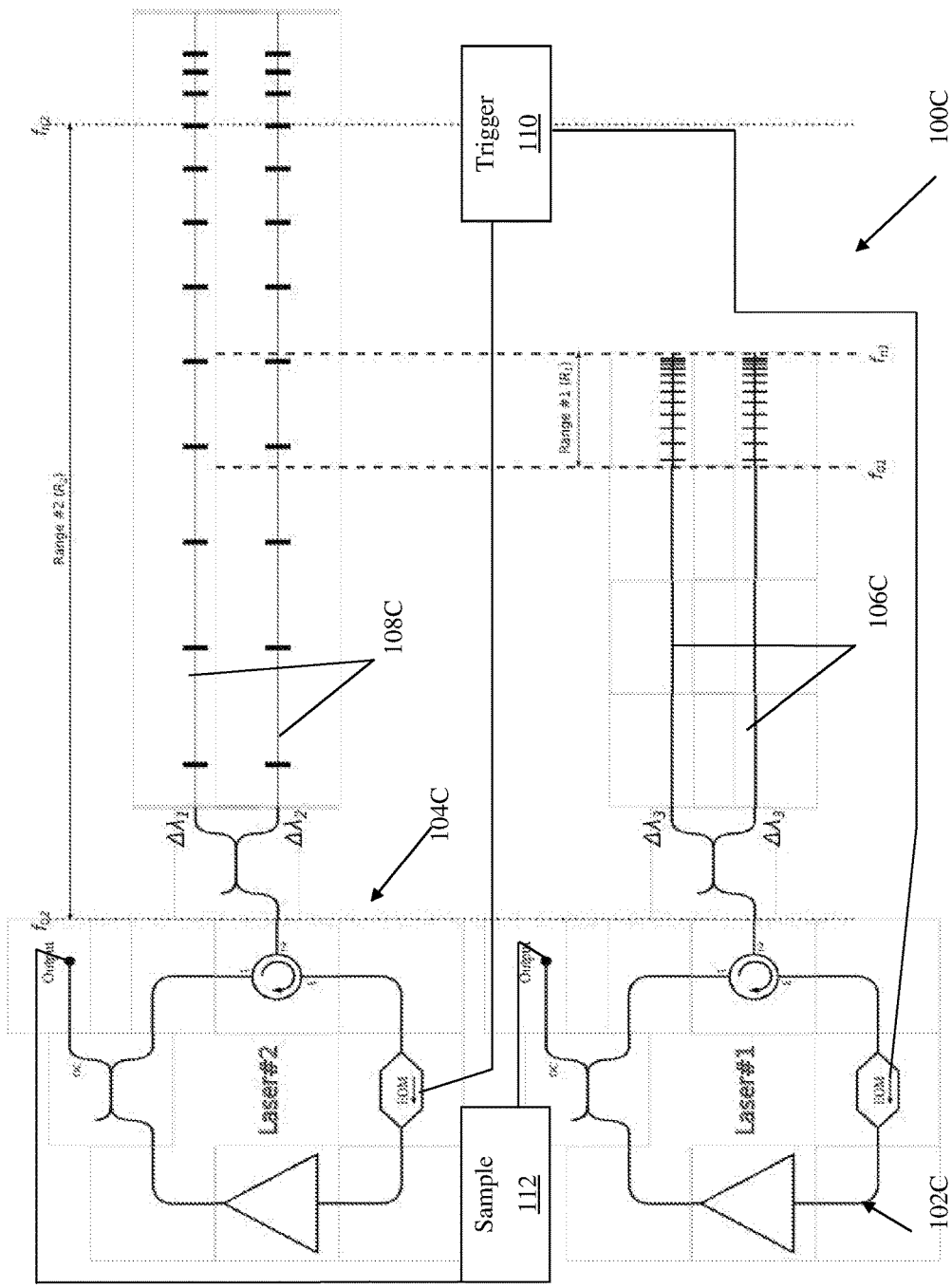
FIG. 14, in a schematic view, illustrates a synchronized laser system in accordance with yet another alternative embodiment of the present invention.

If we create parallel paths in one laser or both lasers 102C and 104C, as in system 100C shown in FIG. 14, such that different zones have the same repetition rate, a wavelength will be emitted for each parallel zone. If both lasers 102C and 104C have such parallel zones we can match a set of (one or more) wavelengths from one laser to a set of (one or more) wavelengths of the other lasers. Note that the parallel branches can be combined with the pairing of different zones, as in the system 100C. In these embodiments, the lasers 102C and 104C have a structure similar to the structure of laser 10H described hereinabove.

It should be noted that having two lasers, as opposed to one laser emitting many wavelengths, creates difficulty in pulse synchronization, which are solved by the present invention, while allowing advantageously to compensate for the group delay outside of the lasers. This characteristic is very important in many applications. In addition, using a single laser to emit pulses at multiple wavelengths can be problematic with some gain media. The use of two lasers solves these problems.

While synchronization of two lasers is described hereinabove, more than two lasers can also by synchronized in a similar manner.

Although the present invention has been described hereinabove by way of preferred embodiments thereof, it can be modified, without departing from the spirit and nature of the subject invention as defined in the appended claims.

What is claimed is:

1. A synchronized laser system for illuminating a sample with first and second laser light pulses having respectively first and second wavelengths, said system comprising:
   a trigger, said trigger being operative to issue first and second trigger signals, said first and second trigger signals being periodic and emitted at a common adjustable frequency with a predetermined delay therebetween, said adjustable frequency being included in a predetermined frequency interval;
   a first tunable mode-locked laser operative for emitting said first laser light pulses in response to receiving a first train of said first trigger signals, said first wavelength of said first laser light pulses being dependent on said adjustable frequency in accordance with a first wavelength-frequency relationship, said first tunable mode-locked laser being operative over a first repetition rate range part of said predetermined frequency interval to produce said first laser light with said first wavelength within a first laser tuning range;
   a second tunable mode-locked laser operative for emitting said second laser light pulses in response to receiving a second train of said second trigger signals, said second wavelength of said second laser light pulses being dependent on said adjustable frequency in accordance with a second wavelength-frequency relationship, said second tunable mode-locked laser being operative over a second repetition rate range part of said predetermined frequency interval to produce said second laser light with said second wavelength within a second laser tuning range;
   wherein
   said predetermined delay is such that said first and second laser light pulses are emitted so as to arrive substantially simultaneously in said sample; and
   said first and second wavelength-frequency relationships are selected to result in a predetermined relationship between said first and second wavelengths at each adjustable frequency from said predetermined frequency interval at which said first and second repetition rate ranges overlap.

2. A system as defined in claim 1, wherein said first and second wavelength-frequency relationships are such that said second wavelength varies less as a function of said adjustable frequency than said first wavelength over said predetermined frequency interval so that over said predetermined frequency interval, said first wavelength varies more than said second wavelength.

3. A system as defined in claim 2, wherein said second wavelength varies at least 100 times more slowly than said first wavelength as a function of said adjustable frequency.

4. A system as defined in claim 2, wherein said sample defines an interaction bandwidth of interest including wavelengths over which a predetermined light-matter interaction occurs, said second laser tuning range being within said interaction bandwidth.

5. A system as defined in claim 4, wherein said sample includes a non-linear material, said predetermined light-matter interaction including a non-linear light-matter interaction occurring in said interaction bandwidth of interest.

6. A system as defined in claim 5, wherein said non-linear material is a frequency doubling material.

7. A system as defined in claim 6, wherein said frequency doubling material is a Lithium Niobate (LiNbO$_3$) crystal, a Barium Borate crystal (BaB$_2$O$_4$) or a Potassium Titanyl Phosphate crystal (KTiOPO$_4$).

8. A system as defined in claim 2, further comprising a non-linear material inserted between said second tunable mode-locked laser and said sample.

9. A system as defined in claim 8, wherein said non-linear material is a frequency-doubling material operative for producing light having a third wavelength that is half the first wavelength when illuminated with said first laser light pulses.

10. A system as defined in claim 2, wherein said first repetition rate range is entirely included in said second repetition rate range.

11. A system as defined in claim 1, wherein said first and second wavelength-frequency relationships are such that said first and second wavelengths are respectively a first and a second monotonous function of said adjustable frequency.

12. A system as defined in claim 1, wherein said predetermined frequency interval defines a first interval region and a second interval region, said first and second wavelength-frequency relationships being such that said first and second wavelengths are respectively monotonous functions of said adjustable frequency over each of said first and second interval regions.

13. A system as defined in claim 1, wherein said first tunable mode-locked laser is operative for emitting third laser light pulses in response to receiving said first train of said first trigger signals, a third wavelength of said third laser light pulses being dependent on said adjustable frequency in accordance with a third wavelength-frequency relationship, said first tunable mode-locked laser being operative over said first repetition rate range to also produce said third laser light with said third wavelength within a third laser tuning range.

14. A system as defined in claim 12, wherein said second tunable mode-locked laser is operative for emitting fourth laser light pulses in response to receiving said second train of said second trigger signals, a fourth wavelength of said fourth laser light pulses being dependent on said adjustable frequency in accordance with a fourth wavelength-frequency relationship, said second tunable mode-locked laser being operative over said second repetition rate range to also produce said fourth laser light with said fourth wavelength within a fourth laser tuning range.

15. A system as defined in claim 1, wherein outside of said first and second repetition rate ranges, said first and second tunable mode-locked lasers and are nonoperational to produce respectively said first and second laser light pulses.

* * * * *